(12) United States Patent
Seki et al.

(10) Patent No.: US 7,959,161 B2
(45) Date of Patent: Jun. 14, 2011

(54) RUBBER-LIKE ELASTIC PART

(75) Inventors: Shota Seki, Fujisawa (JP); Masayuki Kishimoto, Fujisawa (JP)

(73) Assignee: NOK Corporation, Tokyo (JP)

( * ) Notice: Subject to any disclaimer, the term of this patent is extended or adjusted under 35 U.S.C. 154(b) by 68 days.

(21) Appl. No.: 10/515,294

(22) PCT Filed: Jun. 20, 2003

(86) PCT No.: PCT/JP03/07867
§ 371 (c)(1),
(2), (4) Date: Nov. 22, 2004

(87) PCT Pub. No.: WO2004/044463
PCT Pub. Date: May 7, 2004

(65) Prior Publication Data
US 2005/0225039 A1    Oct. 13, 2005

(30) Foreign Application Priority Data

Nov. 12, 2002 (JP) ................................ 2002-327771

(51) Int. Cl.
*F16J 15/02* (2006.01)
*F16J 15/10* (2006.01)

(52) U.S. Cl. ......... 277/648; 277/630; 277/637; 277/644

(58) Field of Classification Search .................. 277/630, 277/637, 641, 644, 648, 649, 653
See application file for complete search history.

(56) References Cited

U.S. PATENT DOCUMENTS

| | | | | |
|---|---|---|---|---|
| 1,883,609 A * | 10/1932 | Dennis | ......................... | 49/495.1 |
| 2,058,010 A * | 10/1936 | Fitch | .............................. | 277/649 |
| 2,091,913 A * | 8/1937 | Duritza | ......................... | 277/630 |
| 2,210,183 A * | 8/1940 | Schweighart | ................. | 206/557 |
| 2,445,952 A * | 7/1948 | Lagergren | ...................... | 277/630 |
| 2,661,229 A * | 12/1953 | Slaughter, Jr. | ................ | 277/645 |
| 2,777,282 A * | 1/1957 | Piquerez | ....................... | 368/291 |
| 3,166,332 A * | 1/1965 | Olson | .......................... | 277/644 |
| 3,750,411 A * | 8/1973 | Shimizu | ......................... | 405/135 |
| 3,892,417 A * | 7/1975 | Clayton | ......................... | 277/648 |
| 3,991,897 A * | 11/1976 | Meyers | ......................... | 215/230 |
| 4,192,520 A * | 3/1980 | Hasegawa | ...................... | 277/591 |
| 4,640,455 A * | 2/1987 | Grein et al. | .................... | 228/176 |
| 4,715,609 A * | 12/1987 | Mino et al. | ..................... | 277/608 |
| 4,758,004 A * | 7/1988 | Semon | .......................... | 277/648 |

(Continued)

FOREIGN PATENT DOCUMENTS

JP        58081269        *   5/1983

(Continued)

*Primary Examiner* — Alison K Pickard
(74) *Attorney, Agent, or Firm* — Jacobson Holman PLLC

(57) ABSTRACT

In order to make it possible to previously specify which of two members the rubber-like elastic part pinched between the two members attaches to, and to improve workability of rework or the like, an attachment member specifying structure is provided in the rubber-like elastic part so that the rubber-like elastic part is surely detached from one member and attached to the other member at a time of moving the two members apart from each other, preferably by forming a contact area with one member in the rubber-like elastic part smaller than a contact area with the other member, by forming a surface treated portion by matte finishing or the like in a contact area with one member in the rubber-like elastic part, or by forming a projection-like spring portion elastically pressed to one member so as to achieve a spring effect.

7 Claims, 15 Drawing Sheets

U.S. PATENT DOCUMENTS

| | | | | |
|---|---|---|---|---|
| 4,934,715 | A * | 6/1990 | Johnson | 277/647 |
| 5,002,290 | A * | 3/1991 | Pernin | 277/649 |
| 5,007,202 | A * | 4/1991 | Guillon | 49/441 |
| 5,090,713 | A * | 2/1992 | Johnson | 277/648 |
| 5,435,605 | A * | 7/1995 | Koumatsu et al. | 285/110 |
| 5,511,518 | A * | 4/1996 | Jain et al. | 123/90.37 |
| 5,551,705 | A * | 9/1996 | Chen et al. | 277/648 |
| 5,972,473 | A * | 10/1999 | Arakawa et al. | 428/141 |
| 5,981,047 | A * | 11/1999 | Wilkie | 428/215 |
| 6,045,140 | A * | 4/2000 | Morris, Jr. | 277/630 |
| 6,264,206 | B1 * | 7/2001 | Hashizawa et al. | 277/641 |
| 6,328,316 | B1 * | 12/2001 | Fukuhara et al. | 277/644 |
| 6,523,833 | B1 * | 2/2003 | Ishigaki et al. | 277/650 |
| 6,761,360 | B2 * | 7/2004 | Hammi | 277/630 |
| 7,063,911 | B1 * | 6/2006 | Nagai et al. | 429/35 |
| 7,389,992 | B2 * | 6/2008 | Isono | 277/637 |
| 2003/0184025 | A1 * | 10/2003 | Matsuki | 277/591 |

FOREIGN PATENT DOCUMENTS

| | | |
|---|---|---|
| JP | 62-134967 | 8/1987 |
| JP | 05288116 | * 11/1993 |
| JP | 0601047 | * 7/1994 |
| JP | 09-048448 | 2/1997 |
| JP | 09-282860 | 10/1997 |
| JP | 10-234865 | 9/1998 |
| JP | 2001-108106 | 4/2001 |
| JP | 2001-304421 | 10/2001 |
| JP | 2001-311470 | 11/2001 |

* cited by examiner

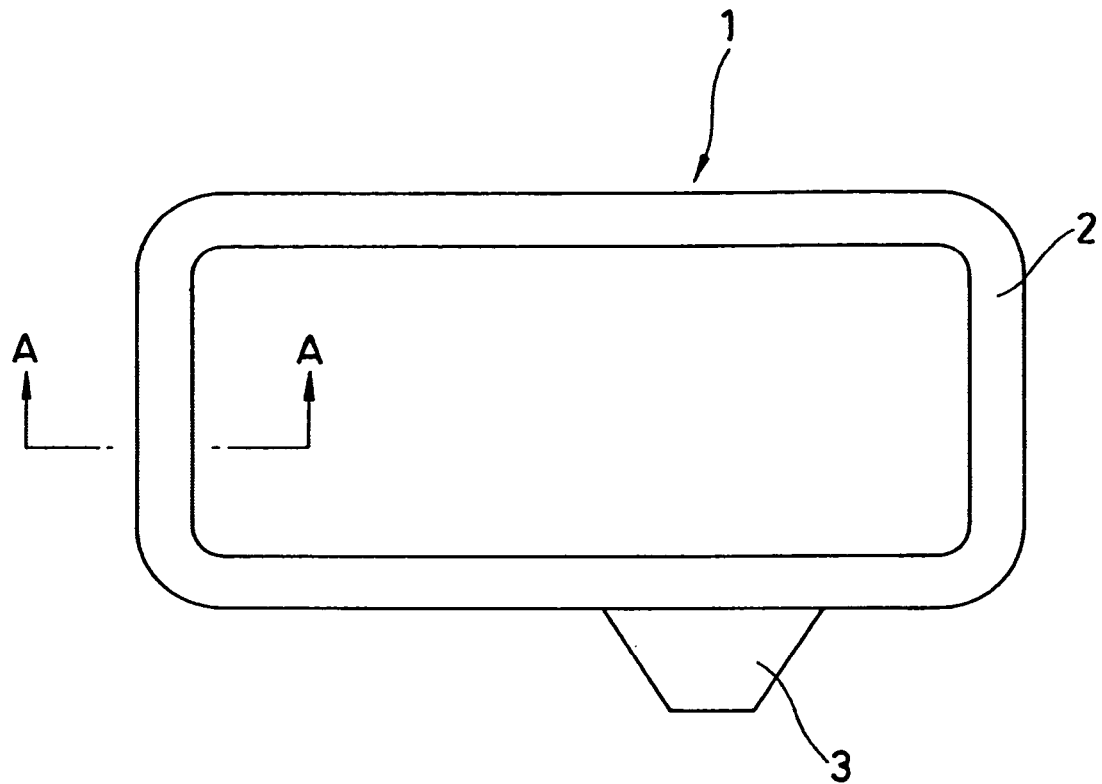
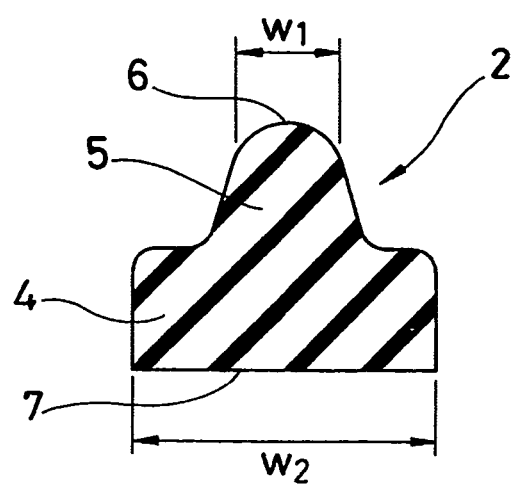

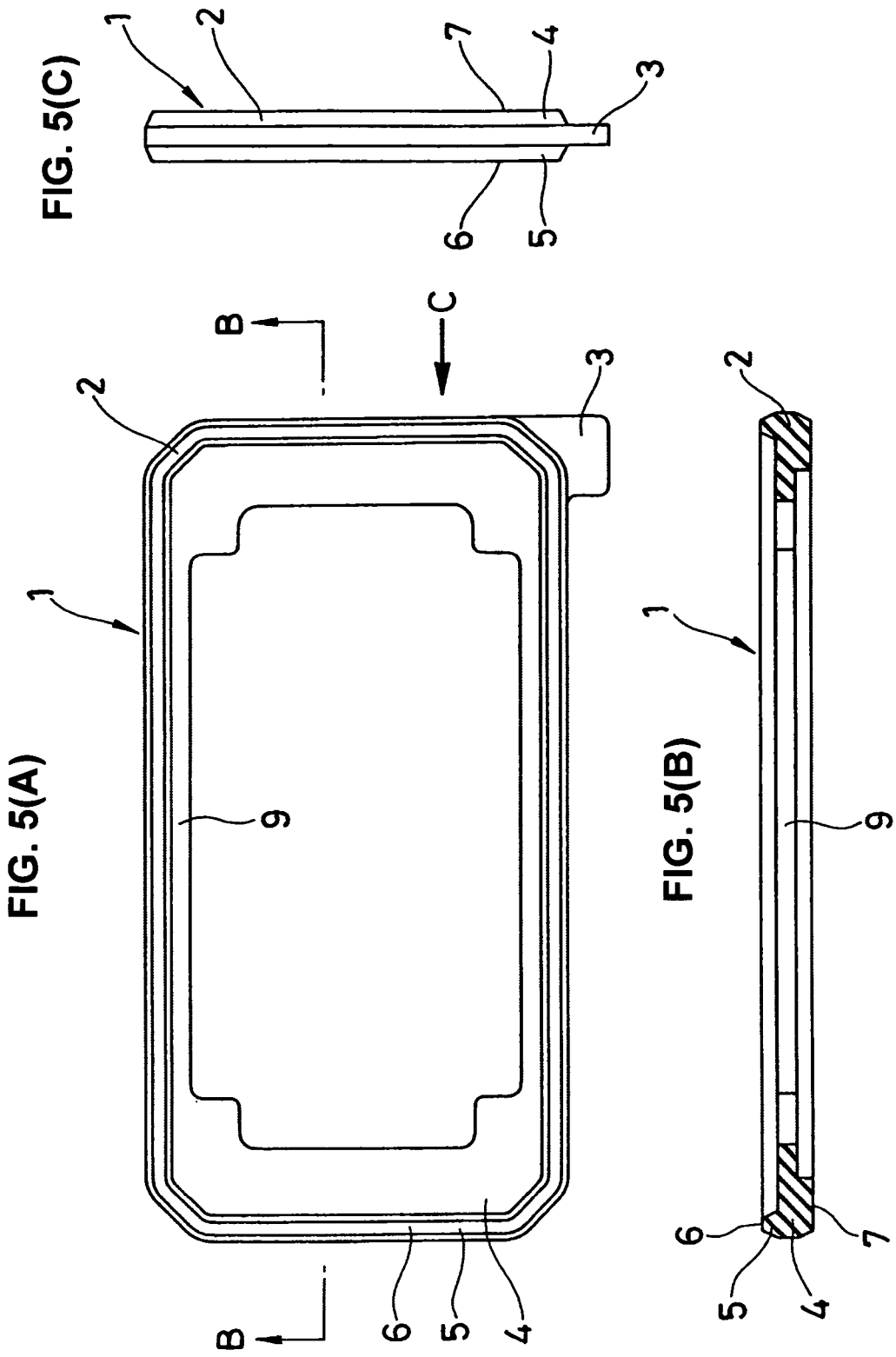

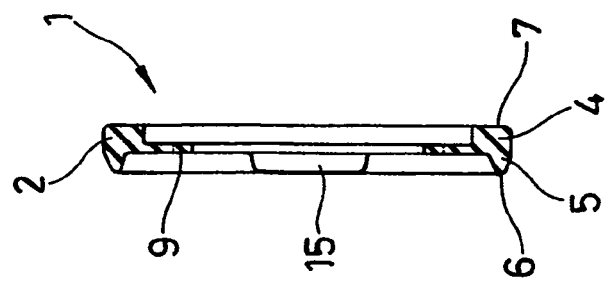
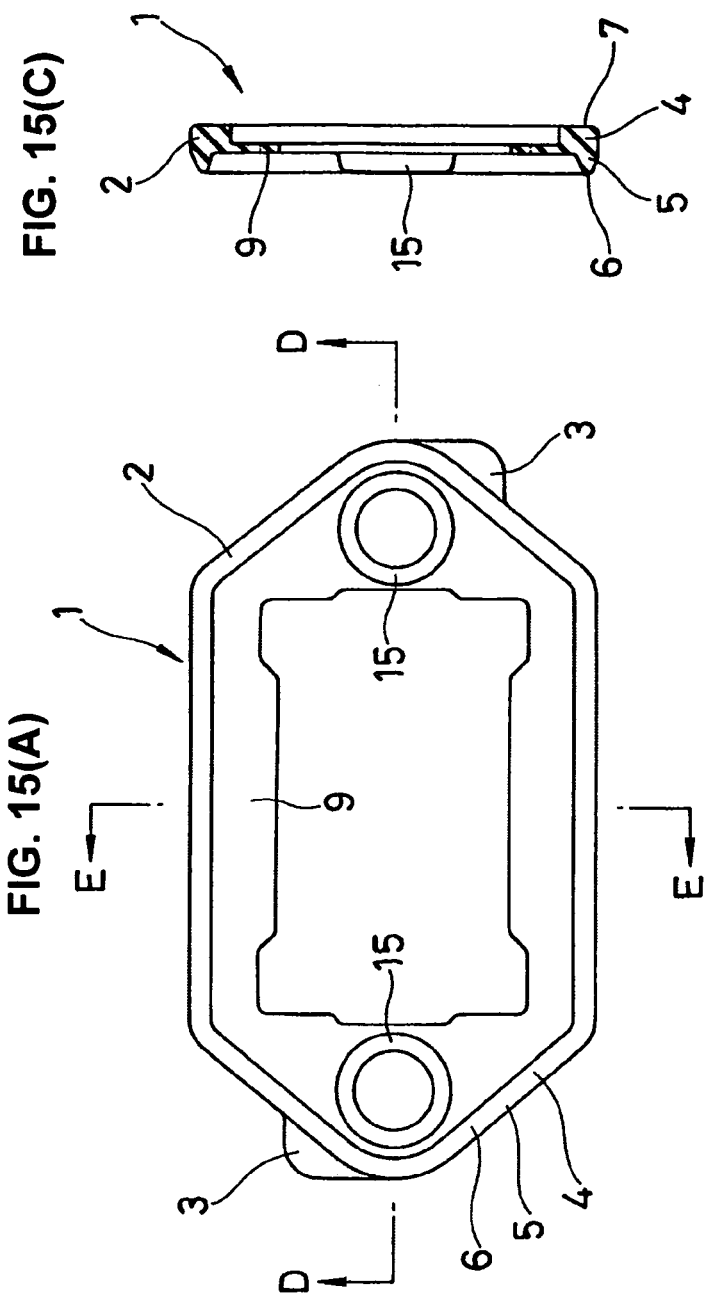
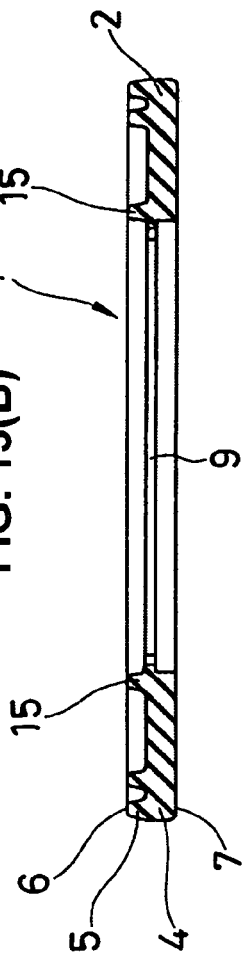

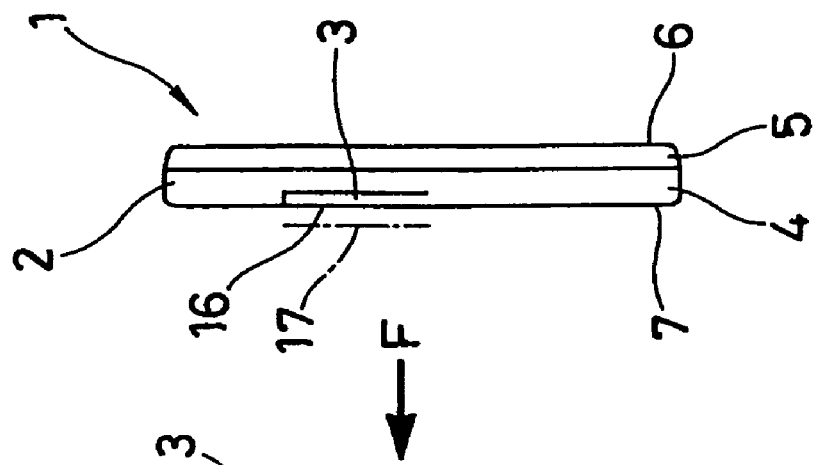
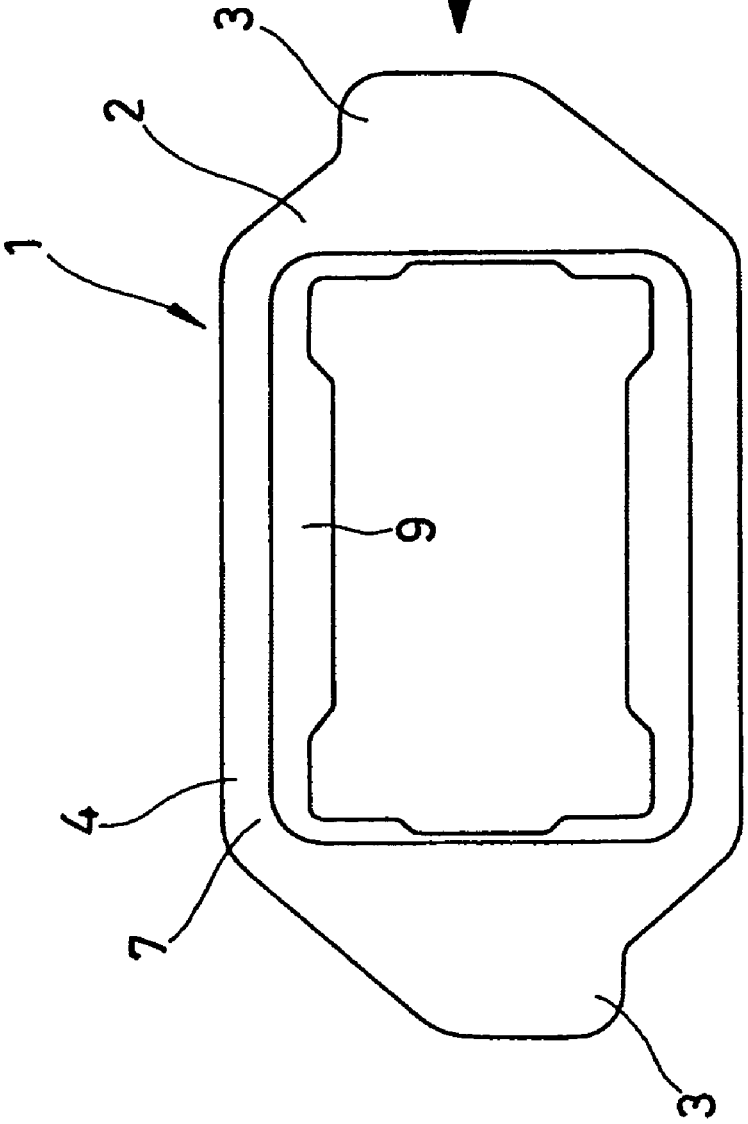

RUBBER-LIKE ELASTIC PART

This is a nationalization of PCT/JP03/007867 filed Jun. 20, 2003 and published in Japanese.

TECHNICAL FIELD

The present invention relates to a pinch structure of a rubber-like elastic part used so as to be pinched between two members opposed to each other without using any adhesive agent. The rubber-like elastic part in accordance with the present invention is employed, for example, as a gasket for sealing between two members or a damping rubber for inhibiting a vibration from being propagated between two members. Further, the rubber-like elastic part in accordance with the present invention is also employed as a rubber-like elastic part for a hard disc apparatus (HDD), and is employed, for example, as a connector gasket for HDD, a voice coil motor (VCM) damper for HDD or the like.

BACKGROUND ART

For example, in the HOD, a gasket constituted by an elastic body made of rubber or resin or the like is mounted to each of a top cover portion (a lid portion) and a connector coupling portion, in order to prevent any foreign material such as a dust, a water content or the like from making an intrusion into an inner portion thereof.

In this structure, a flat-shaped structure made of a rubber simple substance is frequently employed as the connector gasket mounted to the connector coupling portion, and a double-sided lip-shaped structure in which a contact area is reduced while taking an adhesive property of the gasket into consideration is employed as the other gaskets.

The connector gasket is used for sealing a portion which takes out a signal from a head to an outer portion of a casing of the HDD via a flexible circuit (FPC), is generally mounted so as to surround the connector mounted to the FPC, is pinched between the FPC and a base made by an aluminum die casting and a cationic coating, and is fastened by screws or the like, thereby achieving a seal effect.

FIG. 20 shows an example of the connector gasket, in which an FPC 52 is mounted to a predetermined position in an inner portion of a base 51. A state in which the FPC 52 is detached from the base 51 and is reversed is shown in FIG. 21. In FIG. 21, reference numeral 53 denotes a connector mounted to a center of a flat surface of the FPC 52. A connector gasket 54 sealing between the base 51 and the FPC 52 is mounted around the connector 53.

In this case, in a manufacturing process of the HDD, the HDD is manufactured by repeating an assembling, an inspection and a rework such as actuating the HDD and executing the inspection after assembling, and executing the rework frequently on the basis of the inspection result. Accordingly, a workability at a time of reworking is especially important.

However, in conventional, since the gasket 54 is firmly fixed to the base 51 and the FPC 52 due to an adhesive property of the gasket 54, there is generated a problem of deterioration in workability, that is, the once mounted FPC 52 can not be easily detached from the base 51. This is because the gasket 54 is adhered to the opposing member (the base 51 and the FPC 52), due to a temperature rise caused by the actuation of the HDD.

Further, since it is uncertain whether the gasket 54 is attached to a side of the base 51 or a side of the FPC 52, at a time of detaching the FPC 52 from the base 51, it is impossible to stabilize a working procedure at a time of reworking.

In particular, in the case that the gasket 54 is attached to the side of the FPC 52, it is necessary to execute a work of peeling the gasket 54 from the base 51 one by one so as to attach to the side of the FPC 52 at a time of remounting the FPC 52 to the base 51. Further, accompanying therewith, it is necessary to check which of the FPC 52 and the base 51 the gasket 54 is attached to, with respect to all of the gaskets at a time of reworking. In order to surely attach the gasket 54 to any one of the FPC 52 and the base 51, there is a method to attach the gasket 54 by applying an adhesive agent to one surface of the gasket 54, however, in the case of the HDD, an out gas generated from the adhesive agent causes an improper operation.

The present invention is made by taking the points mentioned above into consideration, and an object of the present invention is to provide a pinch structure of a rubber-like elastic part to pinch a rubber-like elastic part between two members opposed to each other without using any adhesive agent, in which it is possible to previously specify which of two members the rubber-like elastic part is attached, whereby it is possible to improve a workability of a rework or the like.

DISCLOSURE OF THE INVENTION

In order to achieve the object mentioned above, in accordance with a first aspect of the present invention, there is provided a pinch structure of a rubber-like elastic part to pinch a rubber-like elastic part between two members opposed to each other without using any adhesive agent, wherein an attachment member specifying structure is provided in such a mariner that the rubber-like elastic part is surely detached from one member and attached to the other member at a time of detaching the two members.

Further, in accordance with a second aspect of the present invention, there is provided a pinch structure of a rubber-like elastic part to pinch a rubber-like elastic part between two members opposed to each other without using any adhesive agent, wherein a contact area with one member in the rubber-like elastic part is formed smaller than a contact area with the other member in such a manner that the rubber-like elastic part is surely detached from the one member and attached to the other member at a time of detaching the two members.

Further, in accordance with a third aspect of the present invention, there is provided a pinch structure of a rubber-like elastic part to pinch a rubber-like elastic part between two members opposed to each other without using any adhesive agent, wherein a surface treated portion formed by matte finishing or the like is provided in a contact area with one member in the rubber-like elastic part in such a manner that the rubber-like elastic part is surely detached from the one member and attached to the other member at a time of detaching the two members.

Further, in accordance with a fourth aspect of the present invention, there is provided a pinch structure of a rubber-like elastic part to pinch a rubber-like elastic part between two members opposed to each other without using any adhesive agent, wherein a projection-like spring portion elastically pressed to one member so as to achieve a spring effect is provided in such a manner that the rubber-like elastic part is surely detached from the one member and attached to the other member at a time of detaching the two members.

Further, in accordance with a fifth aspect of the present invention, there is provided a pinch structure of a rubber-like elastic part as described in any one of the first to fourth aspects mentioned above, wherein a surface treated portion such as matte finishing or the like, or a detachment facilitating portion constituted by a concavity and convexity or the like is provided in a contact surface with the other member in a lug portion of the rubber-like elastic member in such a manner as to easily peel the rubber-like elastic part from the other member.

Further, in accordance with a sixth aspect of the present invention, there is provided a pinch structure of a rubber-like elastic part as described in any one of the first to fifth aspects mentioned above, wherein the rubber-like elastic part is constituted to be a gasket or a gasket for HDD.

Further, in accordance with a seventh aspect of the present invention, there is provided a pinch structure of a rubber-like elastic part as described in any one of the first to fifth aspects mentioned above, wherein the rubber-like elastic part is constituted to be a damping rubber or a damping rubber for HDD.

Further, in accordance with an eighth aspect of the present invention, there is provided a pinch structure of a rubber-like elastic part as described in anyone of the first to fifth aspects mentioned above, wherein the rubber-like elastic part is constituted to be a rubber-like elastic part for HDD.

In the pinch structure of a rubber-like elastic part in accordance with the first aspect of the present invention provided with the structure mentioned above, since the attachment member specifying structure is provided in the rubber-like elastic part in such a manner that the rubber-like elastic part is surely detached from one member and attached to the other member, the rubber-like elastic part is surely detached from one member and attached to the other member, whereby it is possible to specify the member to be attached.

As specified examples of the attachment member specifying structure, it is preferable to form the contact area with one member in the rubber-like elastic part smaller than the contact area with the other member, as described in the second aspect, to form the surface treated portion formed by the matte finishing or the like in the contact area with one member in the rubber-like elastic part, as described in the third aspect, and to form the projection-like spring portion elastically pressed to one member so as to achieve the spring effect as described in the forth aspect.

Further, in addition to them, as in the pinch structure of a rubber-like elastic part in accordance with the fifth aspect of the present invention provided with the structure mentioned above, in the case that the surface treated portion such as the matte finishing or the like, or the detachment facilitating portion constituted by the concavity and convexity or the like is provided in the contact surface with the other member in the lug portion of the rubber-like elastic member, the peeling work can be easily executed at a time of peeling the rubber-like elastic part in a state of being attached to the other member from the other member.

The rubber-like elastic part in accordance with the present invention is constituted, for example, to be the gasket or the gasket for HDD (the sixth aspect), the damping rubber or the damping rubber for HDD (the seventh aspect), and the rubber-like elastic part for HDD (the eighth aspect). However, with respect to the structure relevant to the HDD, since no adhesive agent is used at a time of attaching, there is no problem of the improper operation caused by the out gas generation.

In this case, the following technical matters are included in the present application.

In other words, in order to achieve the object mentioned above, the rubber-like elastic part proposed by the present application is provided with the following contents.

(1) A single-sided adhesive property and a single-sided non-adhesive property are provided by making a contact area in a side requiring a non-adhesive property smaller than that in a side requiring an adhesive property.

The elastic body such as the rubber or the resin or the like has a different adhesive property which is individual in each of the materials, and a detachment load is dependent on the adhesive property and the contact area of the elastic body. Accordingly, in the case that the contact area is small as in a lip shape, the detachment load becomes small, and in the case that the contact area is made large such as in a flat shape, the detachment load becomes large. Therefore, the single-sided adhesive property and the single-sided non-adhesive property can be provided by making the contact area in the side requiring the non-adhesive property smaller than that in the side requiring the adhesive property.

(2) The single-side adhesive property and the single-sided non-adhesive property are provided by applying a surface treatment such as matte finishing or the like only to the side requiring non-adhesive property.

The contact area can be differentiated between the side requiring the adhesive property and the side requiring the non-adhesive property, and the single-sided adhesive property and the single-sided non-adhesive property can be provided, by applying the surface treatment such as the matte finishing or the like only to the side requiring the non-adhesive property.

(3) A detachment is facilitated by forming a projection portion aiming at a spring effect in a side requiring a non-adhesive property.

The gasket is provided with the projection aiming at the spring effect in addition to the lip or the projection portion having the gasket function. In this case, a collapsing margin of the projection portion is set larger than a collapsing margin of the lip or the projection portion in the side requiring the non-adhesive property. It is possible to lift up the gasket on the basis of a repulsion force in the projection, to generate a force in a direction of peeling the firmly fixed contact portion, and to facilitate the detachment.

(4) A convexity and concavity is provided only in the lug portion, while the whole is formed in a flat shape, in the side requiring adhesive property so as to give an adhesive property and to facilitate the detachment at a time of requiring the detachment.

The connector gasket can be provided with a lug portion in addition to a sealing functioning portion with taking into consideration a workability at a time of positioning and mounting. In the case that it is intended to detach the firmly fixed gasket in the side requiring the adhesive property, the contact area can be reduced and the adhesive property can be lowered by forming the concavity and convexity or the surface treatment such as the matte finishing or the like for reducing the contact area only in the lug portion so as to facilitate the detachment. It is possible to detach in a shearing direction by peeling from the lug portion, and it is easy to detach.

BRIEF DESCRIPTION OF THE DRAWINGS

FIG. 1 is a plan view of a gasket in accordance with a first embodiment of the present invention;

FIG. 2 is an enlarged cross sectional view along a line A-A in FIG. 1;

FIGS. 5A, 5B and 5C are detailed views of the gasket having the cross sectional shape shown in FIG. 4C, in which FIG. 5A is a plan view, FIG. 5B is a cross sectional view along a line B-B in FIG. 5A, and FIG. 5C is a view as seen from a direction of an arrow C in FIG. 5A;

FIGS. 15A, 15B and 15C are views showing a gasket in accordance with a fourth embodiment of the present invention, in which FIG. 15A is a plan view, FIG. 15B is a cross sectional view along a line D-D in FIG. 15A, and FIG. 15C is a cross sectional view along a line E-E in FIG. 15A;

FIGS. 16A and 16B are views showing the gasket in accordance with the fourth embodiment of the present invention, in which FIG. 16A is a bottom view, and FIG. 16B is a view as seen from a direction of an arrow F in FIG. 16A;

BEST MODE FOR CARRYING OUT THE INVENTION

Next, a description will be given of embodiments in accordance with the present invention with reference to the accompanying drawings.

First Embodiment

FIG. 1 shows a flat surface of a gasket 1 corresponding to a rubber-like elastic part in accordance with a first embodiment of the present invention, and an enlarged cross section (a cutoff end surface) along a line A-A thereof is shown in FIG. 2.

Figure 20:
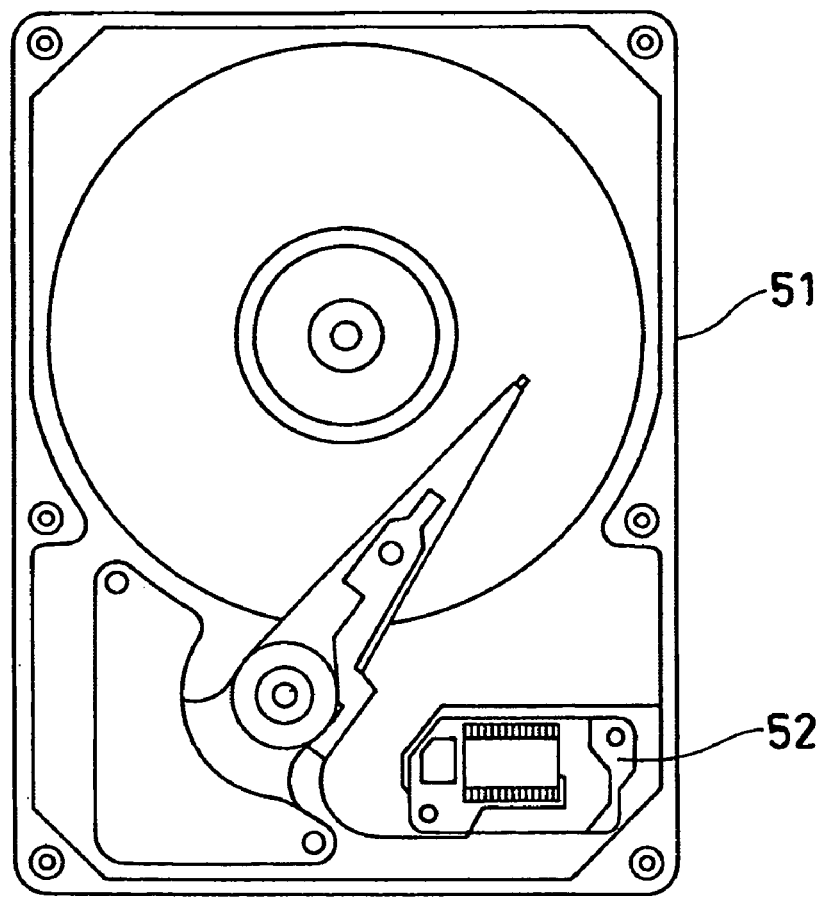
FIG. 20 is a schematic view of an HDD.
Figure 21:
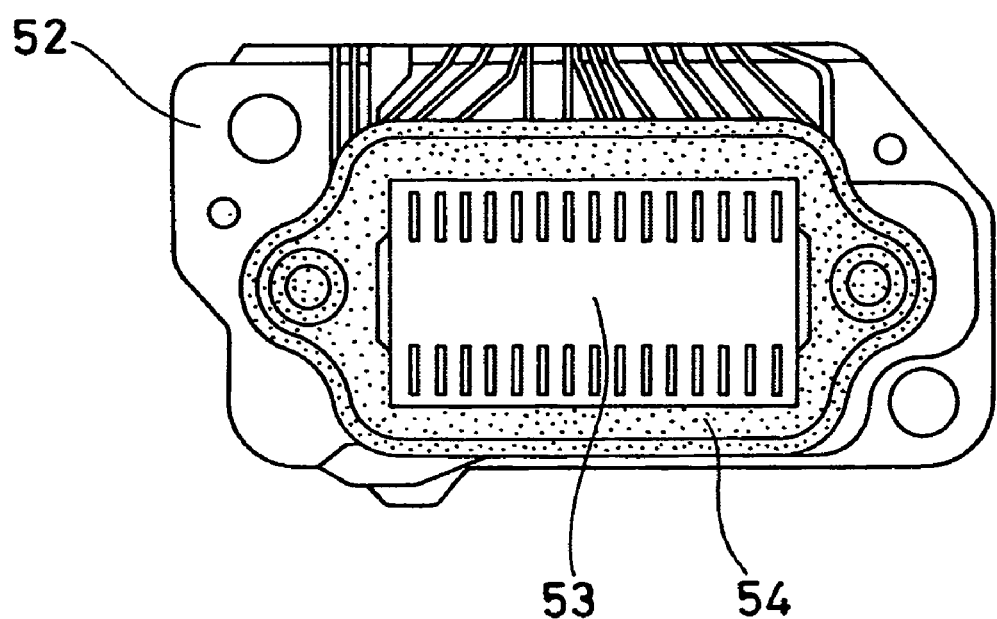
FIG. 21 is a schematic view of an FPC, a connector and a gasket.

The gasket 1 in accordance with the embodiment is mounted around a connector in the HDD as shown in FIGS. 20 and 21 mentioned above, seals between a base corresponding to one member and an FPC corresponding to the other member, and is structured as follows.

In other words, an endless-shaped gasket main body 2 surrounding a circumference of the connector is provided by a rubber-like elastic body made of a predetermined rubber or a resin or the like, and a lug portion 3 is integrally formed at one position on a circumference of an outer peripheral surface of the gasket main body 2.

The gasket main body 2 is structured such that a lip portion 5 having a triangular cross sectional shape or an approximately triangular cross sectional shape (in which a leading end contact surface 6 is formed in a round surface shape having a circular arc cross sectional shape) is integrally formed on one surface of a base portion 4 having a rectangular cross sectional shape or an approximately rectangular cross sectional shape (in which a leading end contact surface 7 is formed in a flat surface shape), as shown in FIG. 2. An attachment member specifying structure is provided in such a manner that the gasket 1 is surely detached from the base so as to be attached to a side of the FPC at a time of detaching the base and the FPC from each other. The attachment member specifying structure is concretely structured such that a contact width w1 of the contact surface 6 in the side of the lip portion 5 with respect to the base is formed smaller than a contact width w2 of the contact surface 7 in the side of the base portion 4 with respect to the FPC, and a contact area of the contact surface 6 in the side of the lip portion 5 with respect to the base is formed smaller than a contact area of the contact surface 7 in the side of the base portion 4 with respect to the FPC. Accordingly, the gasket 1 is surely detached from the base so as to be attached to the side of the FPC, on the basis of difference of an adhesive force caused by difference of the contact width or the contact area between both the contact surfaces 6 and 7.

The cross sectional shape of the gasket 1 is not particularly limited, but may be constituted, for example, in the following shapes.

Figure 3A:
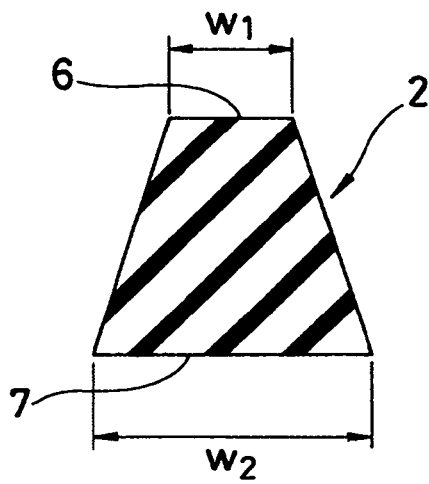
FIGS. 3A, 3B, 3C and 3D are cross sectional views showing other examples of a gasket cross sectional shape.

(1) As shown in FIG. 3A, the cross sectional shape of the gasket main body 2 is formed in a trapezoidal shape or an approximately trapezoidal shape. The narrow contact surface 6 with respect to the base and the wide contact surface 7 with respect to the FPC are both formed in a flat surface shape.

Figure 3B:
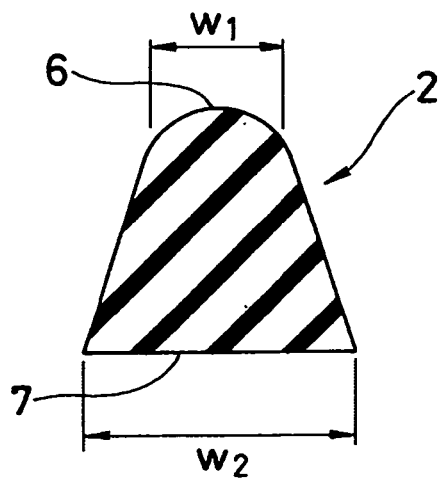

(2) As shown in FIG. 3B, the cross sectional shape of the gasket main body 2 is formed in a triangular shape or an approximately triangular shape. The narrow contact surface 6 with respect to the base is formed in a round surface shape having a circular arc cross sectional shape, and the wide contact surface 7 with respect to the FPC is formed in a flat surface shape.

Figure 3C:
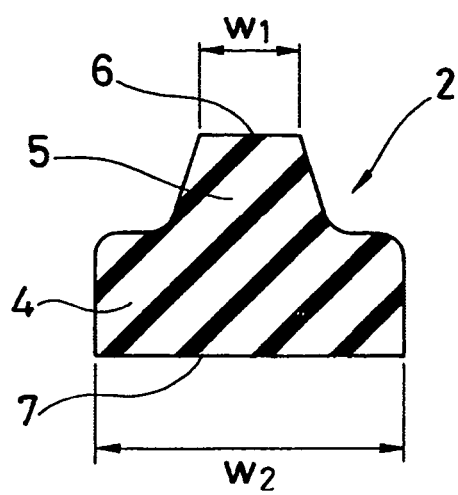

(3) As shown in FIG. 3C, the cross sectional shape of the gasket main body 2 is formed in a shape obtained by integrally forming the lip portion 5 having a trapezoidal cross sectional shape or an approximately trapezoidal cross sectional shape on one surface of the base portion 4 having a rectangular cross sectional shape or an approximately rectangular cross sectional shape. The narrow contact surface 6 in the side of the lip portion 5 with respect to the base and the wide contact surface 7 in the side of the base portion 4 with respect to the FPC are both formed in a flat surface shape.

Figure 3D:
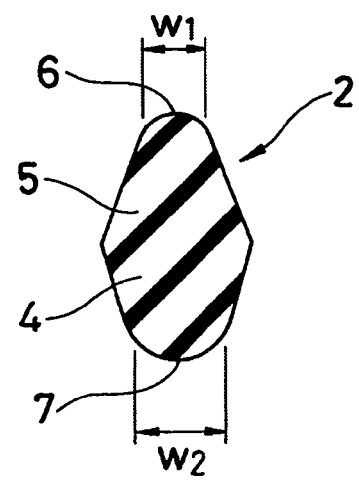

(4) As shown in FIG. 3D, the cross sectional shape of the gasket main body 2 is formed in a shape obtained by integrally forming the lip portion 5 having a triangular cross sectional shape or an approximately triangular cross sectional shape on one surface of the base portion 4 having the triangular cross sectional shape or the approximately triangular cross sectional shape. The narrow contact surface 6 in the side of the lip portion 5 with respect to the base and the wide contact surface 7 in the side of the base portion 4 with respect to the FPC are both formed in a round surface shape having a circular arc cross sectional shape.

Figure 4A:
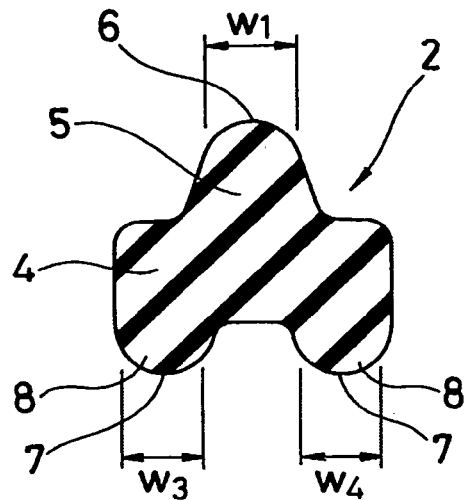
FIGS. 4A, 4B, 4C and 4D are cross sectional views showing other examples of the gasket cross sectional shape.

(5) As shown in FIG. 4A, the cross sectional shape of the gasket main body 2 is formed in a shape obtained by integrally forming the lip portion 5 having a triangular cross sectional shape or an approximately triangular cross sectional shape on a center of one surface of the base portion 4 having a rectangular cross sectional shape or an approximately rectangular cross sectional shape, and integrally forming second lip portions 8 having a triangular cross sectional shape or an approximately triangular cross sectional shape on both end portions of the other surface of the base portion 4. A contact width w2 of the contact surfaces 7 in the side of the second lip portions 8 with respect to the FPC is constituted by a sum of contact widths w3 and w4 of two second lip portions 8 (w2=w3+w4), a contact width w1 of the contact surface 6 in the side of the lip portion 5 with respect to the base is formed smaller than the contact width w2 of the contact surfaces 7 in the side of the second lip portions 8 with respect to the FPC, and the contact area of the contact surface 6 in the side of the lip portion 5 with respect to the base is formed smaller than the contact area of the contact surfaces 7 in the side of the second lip portions 8 with respect to the FPC. Further, the contact surface 6 in the side of the lip portion 5 with respect to the base and the contact surfaces (the respective lip leading ends) 7 in the side of the second lip portions 8 with respect to the FPC are both formed in a round surface shape having a circular arc cross sectional shape.

Figure 4B:
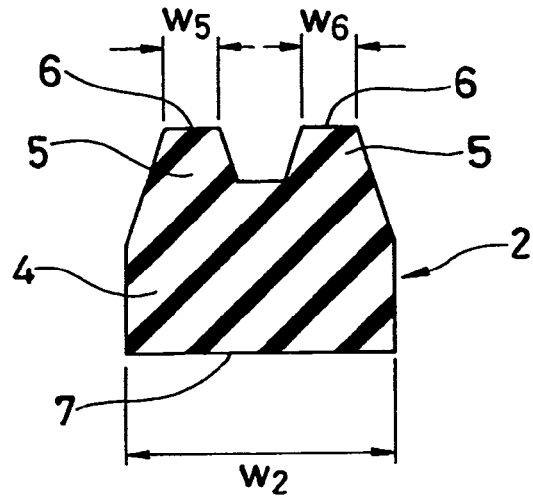

(6) As shown in FIG. 4B, the cross sectional shape of the gasket main body 2 is formed in a shape obtained by integrally forming the lip portions 5 having a trapezoidal cross sectional shape or an approximately trapezoidal cross sectional shape in both end portions of one surface of the base portion 4 having a rectangular cross sectional shape or an approximately rectangular cross sectional shape. The contact width w1 of the contact surfaces 6 in the side of the lip portions 5 with respect to the base is constituted by a sum of contact widths w5 and w6 of two lip portions 5 (w1=w5+w6), the contact width w1 of the contact surfaces 6 in the side of the lip portions 5 with respect to the base is formed smaller than the contact width w2 of the contact surface 7 in the side of the base portion 4 with respect to the FPC, and the contact area of the contact surfaces 6 in the side of the lip portions 5 with respect to the base is formed smaller than the contact area of the contact surface 7 in the side of the base portion 4 with respect to the FPC. Further, the contact surfaces (the respective lip leading ends) 6 in the side of the lip portions 5 with respect to the base and the contact surface 7 in the side of the base portion 4 with respect to the FPC are both formed in a flat surface shape.

Figure 4C:
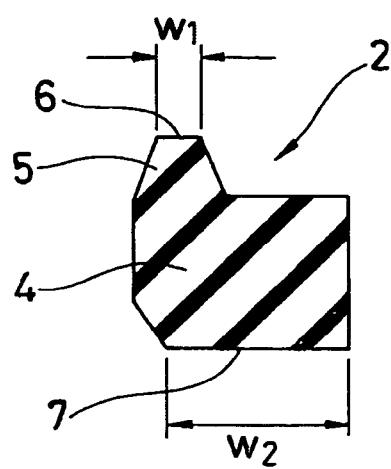
Figure 6A:
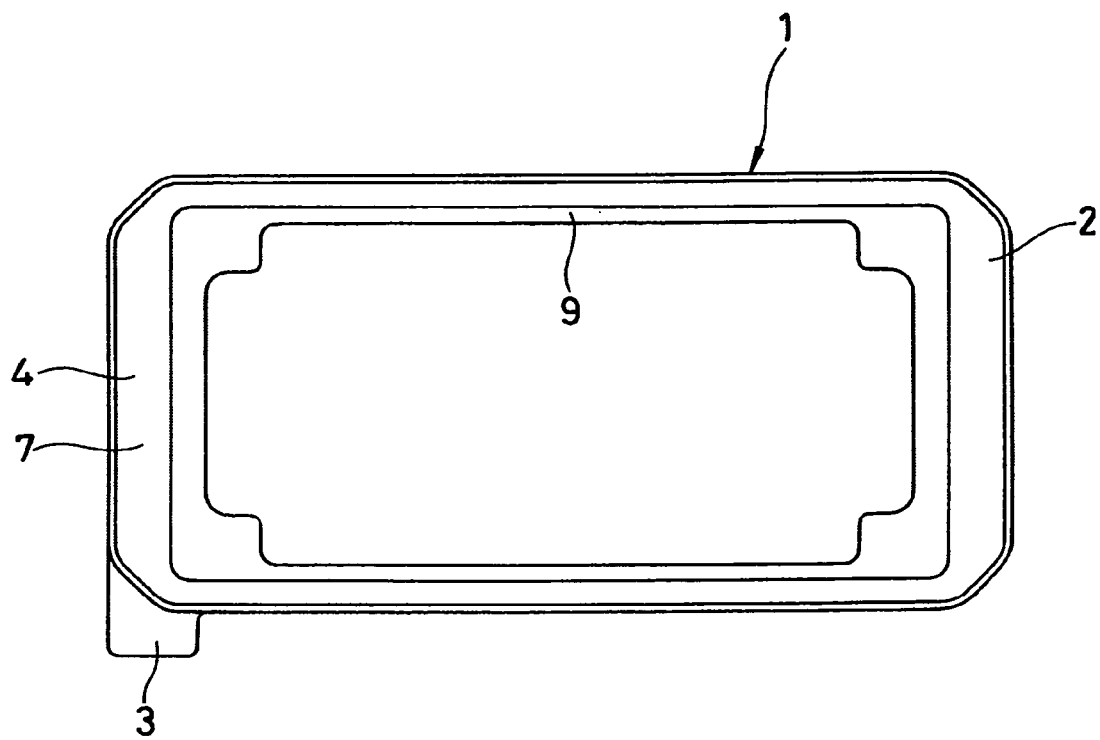
FIG. 6A is a detailed bottom view of the gasket having the cross sectional shape shown in FIG. 4C.

(7) As shown in FIG. 4C, the cross sectional shape of the gasket main body 2 is formed in a shape obtained by integrally forming the lip portion 5 having a trapezoidal cross sectional shape or an approximately trapezoidal cross sectional shape on one end portion of one surface of the base portion 4 having a rectangular cross sectional shape or an approximately rectangular cross sectional shape. The narrow contact surface 6 in the side of the lip portion 5 with respect to the base and the wide contact surface 7 in the side of the base portion 4 with respect to the FPC are both formed in a flat surface shape. FIGS. 5 and 6A show the entire of the gasket 1 provided with the cross section, formed in this shape. As illustrated, in the gasket 1, a flange portion 9 having a thin plate shape for positioning the gasket 1 with respect to the connector is integrally formed in an inner peripheral side of the gasket main body 2, in addition to the gasket main body 2 and the lug portion 3.

Figure 4D:
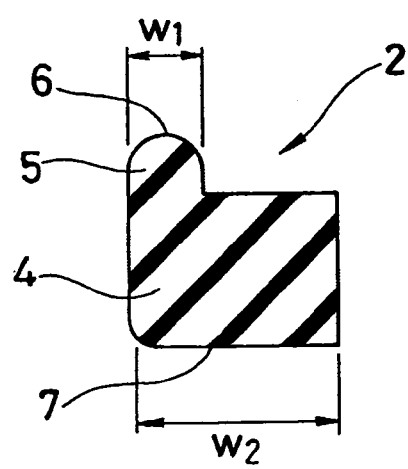

(8) As shown in FIG. 4D, the cross sectional shape of the gasket main body 2 is formed in a shape obtained by integrally forming the lip portion 5 having a semicircular cross sectional shape or an approximately semicircular cross sectional shape on one end portion of one surface of the base portion 4 having a rectangular cross sectional shape or an approximately rectangular cross sectional shape. The narrow contact surface 6 in the side of the lip portion 5 with respect to the base is formed in a round surface shape having a circular arc cross sectional shape, and the wide contact surface 7 in the side of the base portion 4 with respect to the FPC is formed in a flat surface shape.

Second Embodiment

Figure 7:
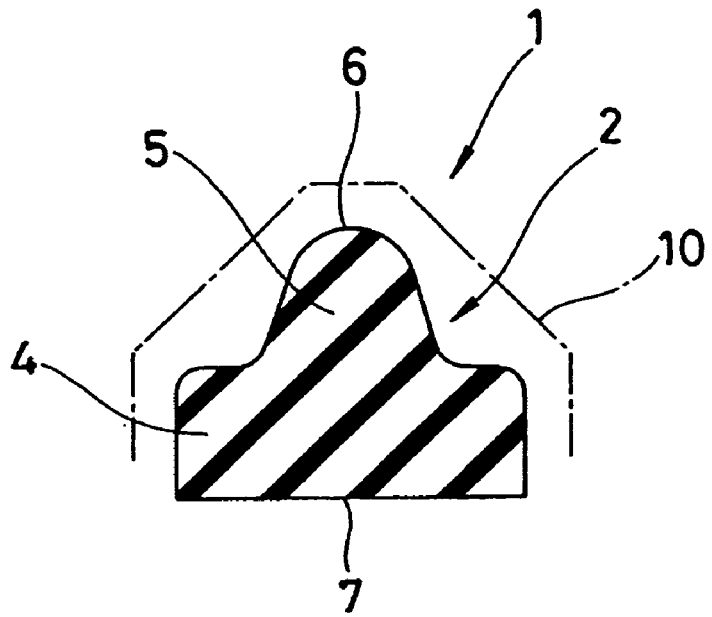
FIG. 7 is a cross sectional view of a gasket in accordance with a second embodiment of the present invention.

FIG. 7 shows a cross section (a cutoff end surface) of a gasket 1 corresponding to a rubber-like elastic part in accordance with a second embodiment of the present invention.

The gasket 1 in accordance with the embodiment is mounted around a connector in the HDD as shown in FIGS. 20 and 21 mentioned above, seals between a base corresponding to one member and an FPC corresponding to the other member, and is structured as follows.

In other words, an endless-shaped gasket main body surrounding a circumference of the connector is provided by a rubber-like elastic body made of a predetermined rubber or a resin or the like, and a lug portion (not shown) is integrally formed at one position on a circumference of the gasket main body 2.

The gasket main body 2 is structured such that a lip portion 5 having a triangular cross sectional shape or an approximately triangular cross sectional shape (in which a leading end contact surface 6 is formed in a round surface shape having a circular arc cross sectional shape) is integrally formed on one surface of a base portion 4 having a rectangular cross sectional shape or an approximately rectangular cross sectional shape (in which a leading end contact surface 7 is formed in a flat surface shape). An attachment member specifying structure is provided in such a manner that the gasket 1 is surely detached from the base so as to be attached to a side of the FPC at a time of detaching the base and the FPC from each other. The attachment member specifying structure is concretely structured such that a surface treated portion 10 constituted by matte finishing or the like is provided in the contact surface 6 in the side of the lip portion 5 with respect to the base. In the drawing, the surface treated portion 10 is provided in all the surface except the contact surface 7 in the side of the base portion 4 with respect to the FPC. A roughness of the matte finishing is between 3 and 20 μm, and preferably between 6 and 10 μm.

Accordingly, in the case that the surface treated portion 10 constituted by the matte finishing or the like is provided in the contact surface 6 in the side of the base, a difference is made in a magnitude of the contact area between the base side and the FPC side, so that a difference is made in a magnitude of the adhesive force between the base side and the FPC side accordingly (the base side is small and the FPC side is large). Therefore, the gasket 1 is surely detached from the base so as to be attached to the side of the FPC.

Figure 8:
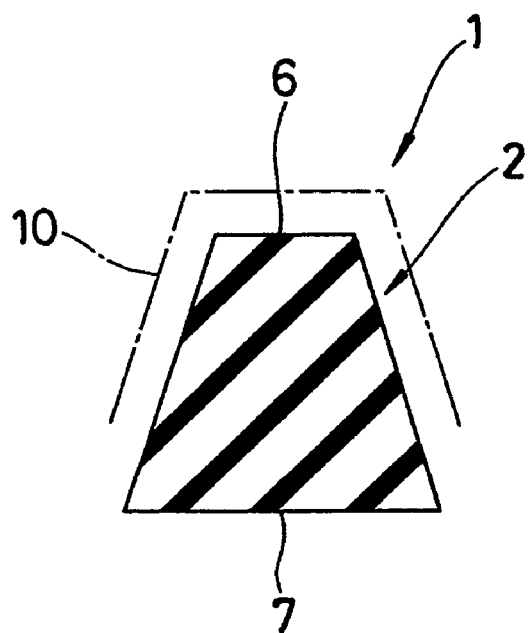
FIG. 8 is a cross sectional view showing another embodiment of the cross sectional shape of the gasket.

The cross sectional shape of the gasket 1 is not particularly limited, but may be constituted, for example, in a shape shown in each of FIGS. 3A to 3D and 4A to 4D mentioned above. FIG. 8 shows an example thereof in which the cross sectional shape of the gasket main body 2 is formed in a trapezoidal shape or an approximately trapezoidal shape.

Third Embodiment

Figure 9:
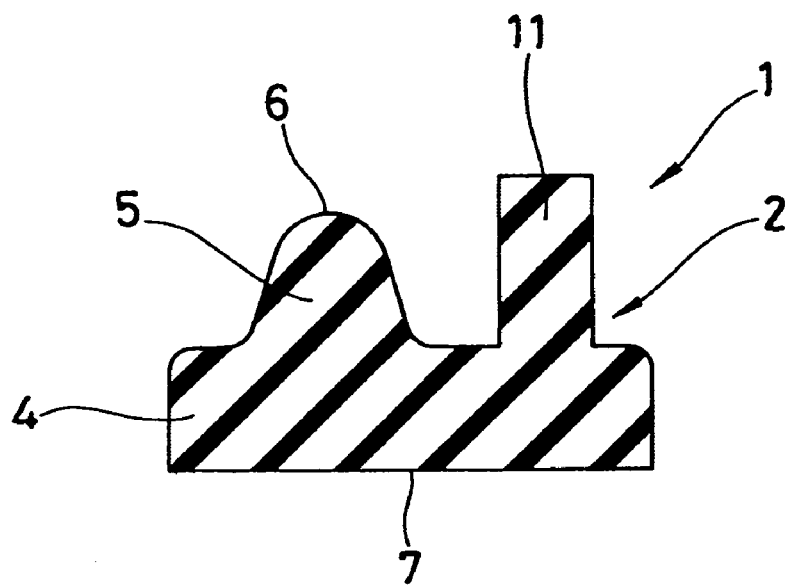
FIG. 9 is a cross sectional view of a gasket in accordance with a third embodiment of the present invention.

FIG. 9 shows a cross section (a cutoff end surface) of a gasket 1 corresponding to a rubber-like elastic part in accordance with a third embodiment of the present invention.

The gasket 1 in accordance with the embodiment is mounted around a connector in the HDD as shown in FIGS. 20 and 21 mentioned above, seals between a base corresponding to one member and an FPC corresponding to the other member, and is structured as follows.

In other words, an endless-shaped gasket main body 2 surrounding a circumference of the connector is provided by a rubber-like elastic body made of predetermined rubber or a resin or the like, and a lug portion (not shown) is integrally formed at one position on a circumference of the gasket main body 2.

The gasket main body 2 is structured such that a lip portion 5 having a triangular cross sectional shape or an approximately triangular cross sectional shape (in which a leading end contact surface 6 is formed in a round surface shape having a circular arc cross sectional shape) is integrally formed on one surface of a base portion 4 having a rectangular cross sectional shape or an approximately rectangular cross sectional shape (in which a leading end contact surface 7 is formed in a flat surface shape). An attachment member specifying structure is provided in such a manner that the gasket 1 is surely detached from the base so as to be attached to a side of the FPC at a time of detaching the base and the FPC from each other. The attachment member specifying structure is concretely is structured such that a projection-like spring portion 11 elastically pressed to the base and achieving a spring effect is integrally formed in the gasket main body 4. The spring portion 11 is provided in the same side as that of the lip portion 5, and is formed in a rectangular cross sectional shape or an approximately rectangular cross sectional shape (in which a leading end surface is formed in a flat surface shape).

Accordingly, in the case that the projection-like spring portion 11 achieving the spring effect is provided as mentioned above, the contact surface 6 in the side of the base is peeled from the base due to its elastic property, or becomes to be easily peeled at least, so that a difference is made in a magnitude of the adhesive force between the base side and the FPC side accordingly (the base side is small and the FPC side is large). Therefore, the gasket 1 is surely detached from the base so as to be attached to the side of the FPC.

Figure 10:
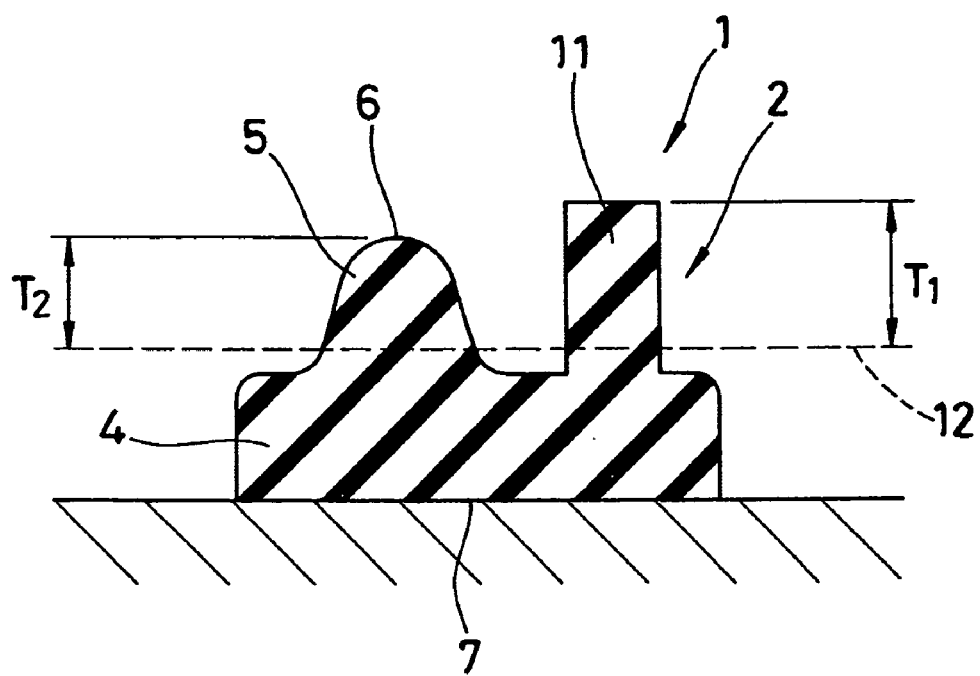
FIG. 10 is a schematic view relating to a magnitude of a collapsing margin.
Figure 11:
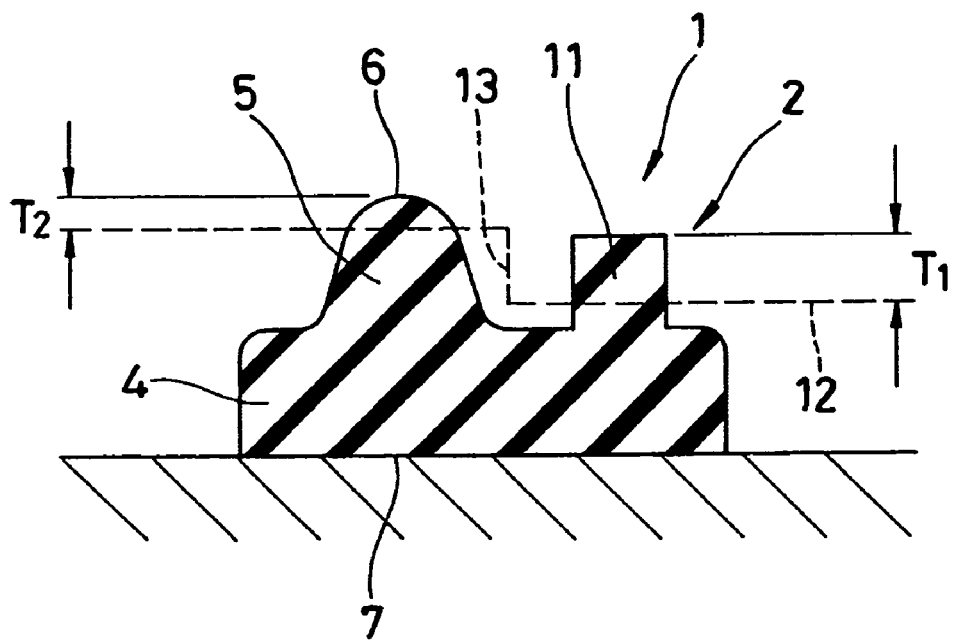
FIG. 11 is a schematic view relating to the magnitude of a collapsing margin.

In this case, in order to achieve the effect mentioned above, it is effective to set a collapsing margin T1 of the spring portion 11 to be larger than a collapsing margin T2 of the lip portion 5. In the case of setting the collapsing margin T1 of the spring portion 11 to be larger than the collapsing margin T2 of the lip portion 5, a height of the spring portion 11 is generally formed larger than a height of the lip portion 5 due to the flat surface shape of the base portion 12 as shown in FIG. 10. However, in the case that a step 13 or the like is provided in the base 12 as shown in FIG. 11, there is a case that the height of the spring portion 11 is formed smaller than the height of the lip portion 5.

The cross sectional shape of the gasket 1 is not particularly limited, and the following shapes may be employed, for example.

Figure 12:
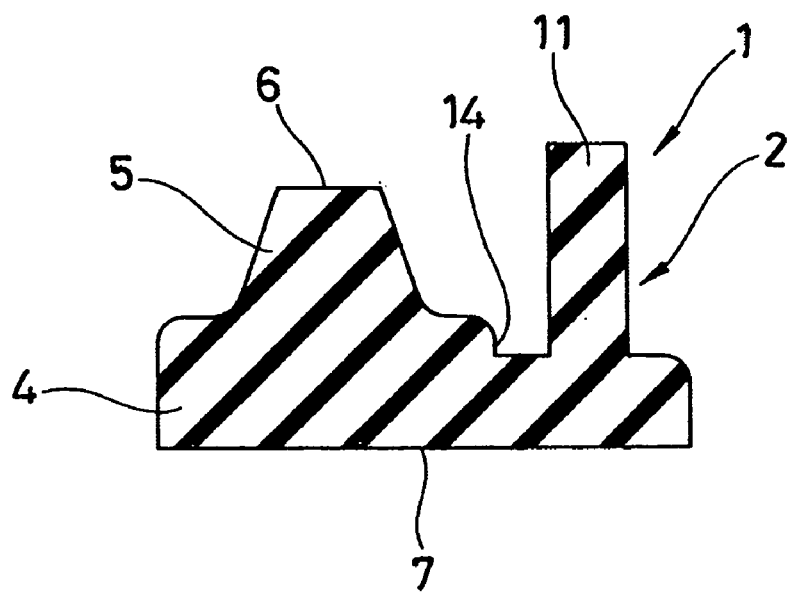
FIG. 12 is a cross sectional view showing another example of the cross sectional shape of the gasket.

(1) As shown in FIG. 12, the cross sectional shape of the lip portion 5 is formed in a trapezoidal shape or an approximately trapezoidal shape, and the contact surface 6 in the side of the lip portion 5 with respect to the base is formed in a flat surface shape. Further, in order to secure the height of the spring portion 11, a step 14 is formed in one surface of the gasket main body 4.

Figure 13:
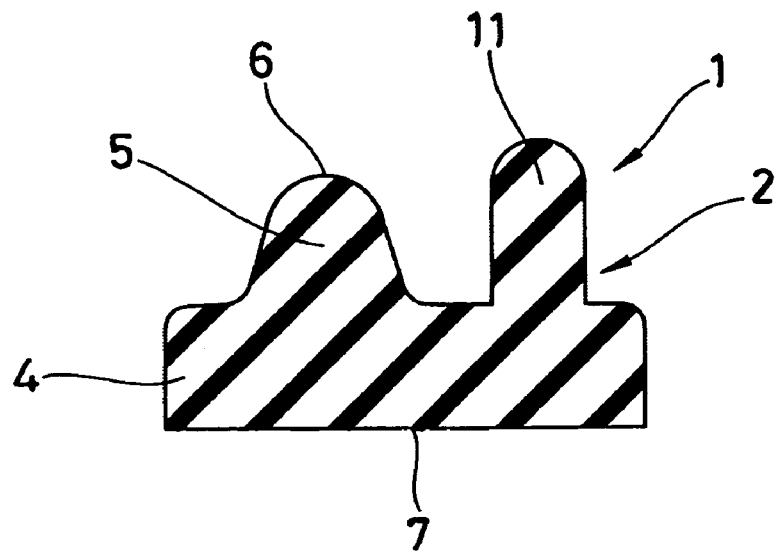
FIG. 13 is a cross sectional view showing another example of the cross sectional shape of the gasket.

(2) As shown in FIG. 13, the leading end surface of the spring 11 is formed in a round surface shape having a circular arc cross sectional shape.

Figure 14:
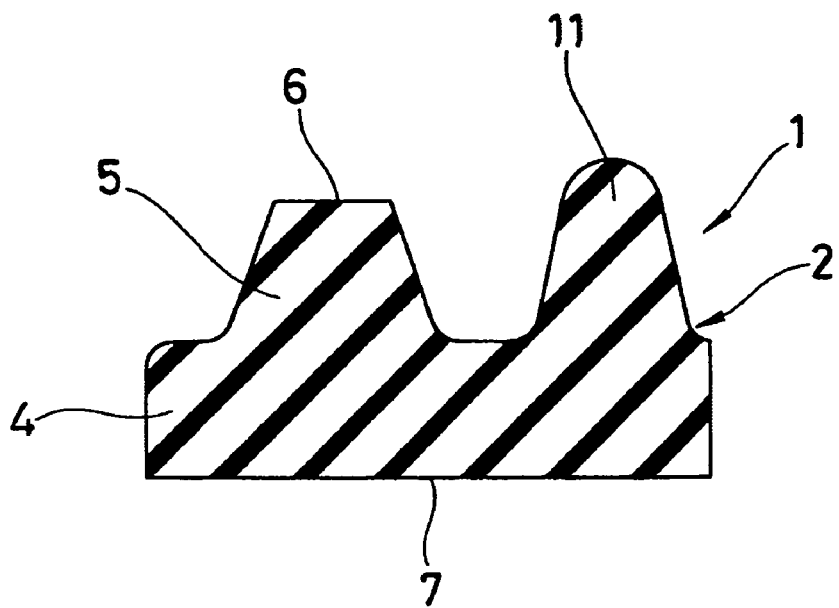
FIG. 14 is a cross sectional view showing another example of the cross sectional shape of the gasket.

(3) As shown in FIG. 14, the width of the spring portion 11 is formed so as to be gradually smaller from the base end portion toward the leading end portion. Further, in addition, the leading end surface of the spring portion 11 is formed in a round surface shape having a circular arc cross sectional shape.

Fourth Embodiment

FIGS. 15A to 15C and 16A to 16B show a gasket 1 corresponding to a rubber-like elastic part in accordance with a fourth embodiment of the present invention, in which FIG. 15A is a plan view thereof, FIG. 15B is a cross sectional view along a line D-D in FIG. 15A, FIG. 15C is a cross sectional view along a line E-E in FIG. 15A, FIG. 16A is a bottom view thereof, and FIG. 16B is a view as seen from a direction of an arrow F in FIG. 16A.

The gasket 1 in accordance with the embodiment is mounted around the connector in the HDD as shown in FIGS. 20 and 21 mentioned above, seals between the base corresponding to one member and the FPC corresponding to the other member, and is structured as follows.

In other words, an endless-shaped gasket main body 2 surrounding a circumference of the connector is provided by a rubber-like elastic body made of a predetermined rubber or a resin or the like, and lug portions 3 are integrally formed at two positions on a circumference of an outer peripheral surface of the gasket main body 2. Further, a thin plate-like flange portion 9 for positioning the gasket 1 with respect to the connector is integrally formed in an inner peripheral surface of the gasket main body 2, and ring-shaped rib portions 15 for positioning the gasket 1 with respect to the base are integrally formed within a flat surface of the flange portion 9.

The gasket main body 2 is structured, as well shown in FIG. 15C, such that a lip portion 5 having a triangular cross sectional shape or an approximately triangular cross sectional shape (in which a leading end contact surface 6 is formed in a round surface shape having a circular arc cross sectional shape) is integrally formed on an outer peripheral edge portion of one surface of a base portion 4 having a rectangular cross sectional shape or an approximately rectangular cross sectional shape (in which a leading end contact surface 7 is formed in a flat surface shape). An attachment member specifying structure is provided in such a manner that the gasket 1 is surely detached from the base so as to be attached to a side of the FPC at a time of detaching the base and the FPC from each other. The attachment member specifying structure is concretely structured, in the same manner as the first embodiment mentioned above, such that the contact width of the contact surface 6 in the side of the lip portion 5 with respect to the base is formed smaller than the contact width of the contact surface 7 in the side of the base portion 4 with respect to the FPC, and the contact area of the contact surface 6 in the side of the lip portion 5 with respect to the base is formed smaller than the contact area of the contact surface 7 in the side of the base portion 4 with respect to the FPC. Accordingly, the gasket 1 is surely detached from the base and attached to the FPC side on the basis of the difference of the adhesive force caused by the difference of the contact width or the contact area between both the contact surfaces 6 and 7.

The lug portion 3 is provided as a tab for preventing the gasket 1 from being erroneously assembled between inside and out. In other words, a groove (a recess portion) attaching the connector is provided in the base, and in the case that the gasket 1 is assembled contrarily between inside and out at a time of assembling the gasket 1 together with the connector in the groove, the lug portion 3 is interfered with the base and the assembly can not be finished. Accordingly, it is possible to notice the erroneous assembly. The lug portion 3 is provided in the FPC side contact surface 7 of the gasket 1 in a flush manner as shown in FIG. 16B, however, may be sometimes arranged at a middle position in the height direction (a lateral direction in the drawing) of the gasket 1 as shown in FIG. 5C.

Further, the lug portion 3 is provided as a tab for easily peeling the gasket 1 from the FPC. In other words, it is necessary that the gasket 1 is attached to the side of the FPC for working at a time of detaching the FPC from the base in the case of reworking as mentioned above, however, in the case that it is necessary to replace the gasket 1 due to a problem of the gasket 1 itself, it is hard to peel the gasket 1 from the FPC. The lug portion 3 is provided for easily peeling the gasket 1 in the case mentioned above. The gasket 1 can be easily peeled from the side of the FPC by arranging a detachment facilitating portion 17 constituted by the surface treated portion such as the matte finishing or the like in the FPC side contact surface 16 in the lug portion 3. The detachment facilitating portion 17 may be constituted by a recess portion, a convex portion or a combination thereof, in addition to the surface treated portion such as the matte finishing or the like, and may employ any structures as far as the adhesive force per unit area is set to be smaller than that of the FPC side contact surface 7.

The attachment member specifying structures described in the first to fourth embodiments can be employed in the following parts in addition to the connector gasket.

Figure 17:
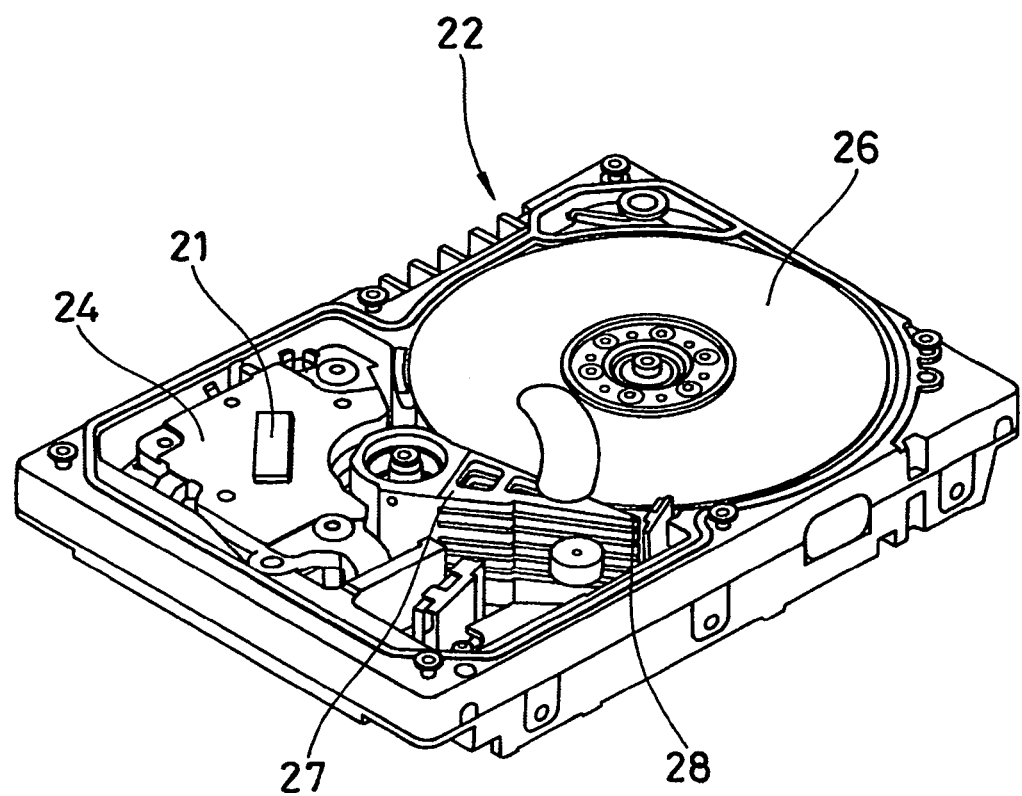
FIG. 17 is a perspective view showing an attached state of a VCM damper in accordance with a fifth embodiment of the present invention.
Figure 18:
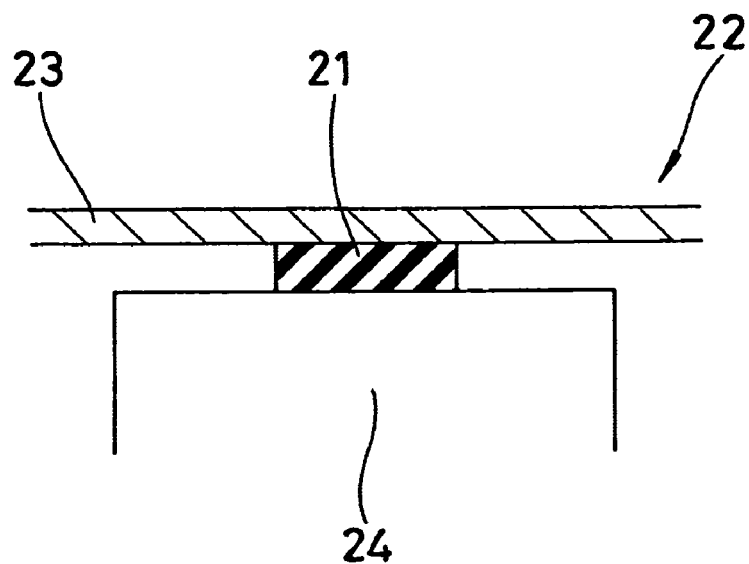
FIG. 18 is a cross sectional view showing the attached state of the VCM damper.

(1) Top cover gasket for HDD
(2) Gasket for general use or specific use other than use for HDD
(3) Damping rubber for HDD
(4) Damping rubber for general use or specific use other than use for HDD Fifth Embodiment FIGS. 17 and 18 show a VCM damper 21 serving as one kind of a damping rubber corresponding to a rubber-like elastic part in accordance with a fifth embodiment of the present invention, in which FIG. 17 is a perspective view of an attached state thereof, and FIG. 18 is a cross sectional view of the attached state thereof.

Figure 19:
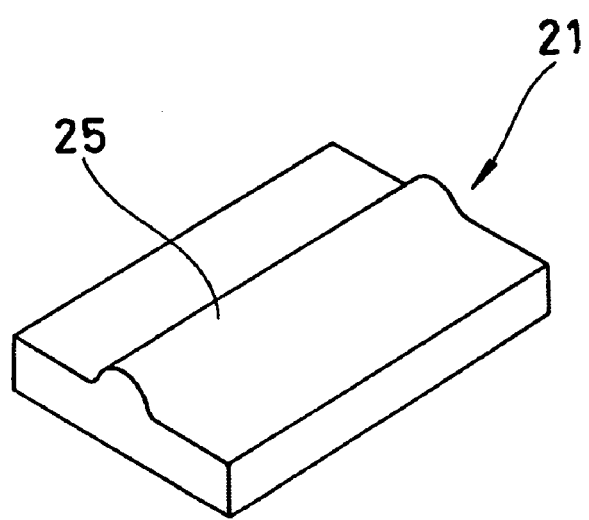
FIG. 19 is a perspective view showing another example of the VCM damper.

The VCM damper 21 in accordance with the embodiment is used so as to be pinched between a top cover 23 corresponding to a casing part of the HDD 22 and a VCM 24 corresponding to an interior part of the HDD 22 with using no adhesive agent, and achieves a damping effect so as to lower a vibration generated at a time of actuating the VCM 24. An attachment member specifying structure is provided such that the VCM damper 21 is surely detached from one of the top cover 23 and the VCM 24 and is attached to the other (for example, detached from the top cover 23 and attached to the VCM 24) at a time of moving the top cover 23 and the VCM 24 apart from each other (at a time of opening the top cover 23). The attachment member specifying structure is concretely structured, for example, by forming a contact area in the VCM damper 21 with respect to the top cover 23 smaller than a contact area with respect to the VCM 24, forming a surface treated portion constituted by matte finishing or the like on a contact surface in the VCM damper 21 with respect to the top cover 23, or forming a projection-like spring portion elastically pressed to the top cover 23 so as to achieve a spring effect. Since the VCM damper 21 is generally formed in a flat plate shape as shown in FIG. 19, it is preferable that a projection-like spring portion 25 is formed in a rib shape. In this case, the VCM 24 is structured such as to swing an arm 27 provided with a magnetic head 28 writing and reading the data with respect to a magnetic disc 26.

EFFECT OF THE INVENTION AND INDUSTRIAL APPLICABILITY

The present invention achieves the following effects.
In the pinch structure of the rubber-like elastic part in accordance with the first aspect of the present invention provided with the structure mentioned above, since the attachment member specifying structure is provided in the rubber-like elastic part in such a manner that the rubber-like elastic part is surely detached from one member and attached to the other member, the rubber-like elastic part is surely detached from one member and attached to the other member at a time of separating two members. Accordingly, it is possible to specify the member to which the rubber-like elastic part is to attach, whereby it is possible to improve a workability and a working efficiency for the rework or the like.

Further, in the pinch structure of the rubber-like elastic part in accordance with the second aspect of the present invention provided with the structure mentioned above, since the attachment member specifying structure is provided in the rubber-like elastic part in such a manner that the rubber-like elastic part is surely detached from one member and attached to the other member, and the attachment member specifying structure is structured by forming the contact area in the rubber-like elastic part with respect to one member smaller than the contact area with respect to the other member, the rubber-like elastic part is surely detached from one member and attached to the other member at a time of separating two members. Accordingly, it is possible to specify the member to which the rubber-like elastic part is to attach, whereby it is possible to improve a workability and a working efficiency for the rework or the like.

Further, in the pinch structure of the rubber-like elastic part in accordance with the third aspect of the present invention provided with the structure mentioned above, since the attachment member specifying structure is provided in the rubber-like elastic part in such a manner that the rubber-like elastic part is surely detached from one member and attached to the other member, and the attachment member specifying structure is structured by forming the surface treated portion constituted by the matte finishing or the like on the contact surface in the rubber-like elastic part with respect to one member, the rubber-like elastic part is surely detached from one member and attached to the other member at a time of separating two members. Accordingly, it is possible to specify the member to which the rubber-like elastic part is to attach, whereby it is possible to improve a workability and a working efficiency for the rework or the like.

Further, in the pinch structure of the rubber-like elastic part in accordance with the fourth aspect of the present invention provided with the structure mentioned above, since the attachment member specifying structure is provided in the rubber-like elastic part in such a manner that the rubber-like elastic part is surely detached from one member and attached to the other member, and the attachment member specifying structure is structured by forming the projection-shaped spring portion elastically pressed to one member so as to achieve the spring effect, the rubber-like elastic part is surely detached from one member and attached to the other member at a time of separating two members. Accordingly, it is possible to specify the member to which the rubber-like elastic part is to attach, whereby it is possible to improve a workability and a working efficiency for the rework or the like.

Further, in addition to them, in the pinch structure of the rubber-like elastic part in accordance with the fifth aspect of the present invention provided with the structure mentioned above, since the surface treated portion such as the matte finishing or the like, or the detachment facilitating portion constituted by the concavity and convexity or the like is provided in the contact surface with the other member in the lug portion of the rubber-like elastic member for the purpose of easily peeling the rubber-like elastic part from the other member, the peeling work can be easily executed at a time of peeling the rubber-like elastic part in a state of being attached to the other member from the other member. Accordingly, it is possible to specify the member to which the rubber-like elastic part is to attach, and it is possible to facilitate the peeling work, whereby it is possible to improve a workability and a working efficiency for the rework or the like.

As mentioned above, the rubber-like elastic part in accordance with the present invention is used, for example, as the gasket or the gasket for HDD (the sixth aspect), as the damping rubber or the damping rubber for HDD (the seventh aspect), or as the rubber-like elastic part for HDD (the eighth aspect). However, with respect to the structure relevant to the HDD, since no adhesive agent is used at a time of attaching, there is no problem of the improper operation caused by the out gas generation.

What is claimed is:

1. A pinch structure comprising
a gasket for a hard disc apparatus having two opposed members, said gasket inhibiting vibration from being propagated between the two opposed members, said gasket including a solid rubber-like elastic part having an adhesive property and an approximately rectangular cross section shaped base portion, said solid rubber-like elastic part being secured and compressed between a first member of the two members and a second member of the two members opposed to each other without using any adhesive agent,
said solid rubber-like elastic part including a first uneven surface on one side of said base portion and contacted with said first member and a second flat surface on an opposite side of said base portion and contacted with said second member;
a magnitude of adhesive force of said first uneven surface to said first member being less than a magnitude of adhesive force of said second flat surface to said second member and, of said first uneven surface and said second flat surface only said first uneven surface having a surface treatment for differentiating between an adhesive property of said first uneven surface and said second flat surface,
an attachment member specifying structure provided on said first uneven surface of said solid rubber-like elastic part;
said attachment member specifying structure including a lip portion spaced inwardly from one lateral peripheral edge of the rubber-like elastic part and a projection-like spring portion spaced inwardly from an opposite lateral peripheral edge of the rubber-like elastic part,
said lip portion being formed in a substantially triangular cross section shape having a round top surface, said projection-like spring portion being formed into a substantially rectangular cross section shape having a flat top surface,
a gap located on said first uneven surface of said solid rubber-like elastic part, said gap extending uninterrupted between said lip portion and said projection-like spring portion,
said solid rubber-like elastic part being provided on a part of an outer periphery, facing away from an interior and component parts of the hard disc apparatus, with a lug portion so as to easily peel said solid rubber-like elastic part from said second member and for preventing erroneous assembly of the two members, said lug portion extending laterally from the gasket in a plane of said base portion, said lug portion being located at only a portion of the outer periphery of said rubber-like elastic part,
said lip portion and said projection-like spring portion having different heights and being elastically pressed to said first member so as to achieve a sealing effect by said lip portion and a spring effect away from said first member by said projection-like spring portion, said projection-like spring portion having a collapsing margin larger than a collapsing margin of said lip portion;
said first uneven surface being biased away from said first member by said projection-like spring portion for generating a force in a direction of peeling away of said second member from said first member to facilitate detachment of the gasket and said second flat surface remaining attached to said second member at a time of separation of said two opposed members.

2. The pinch structure of claim 1, wherein said surface treatment is a matte finish of said first uneven surface.

3. The pinch structure of claim 2, wherein said matte finish is located to extend between and up to the one lateral peripheral edge and the opposite lateral peripheral edge of the rubber-like elastic part.

4. The pinch structure of claim 2, wherein said matte finish is part of the lip portion and the projection-like spring portion.

5. The pinch structure of claim 2, wherein a roughness of the matte finish is between 3 and 20 μm.

6. The pinch structure of claim 2, wherein a flat portion defines the gap between the lip portion and the projection-like spring portion.

7. The pinch structure of claim 6, wherein the flat portion extends entirely between the lip portion and the projection-like spring portion.

* * * * *